United States Patent [19]

Hobson et al.

[11] 4,454,238

[45] Jun. 12, 1984

[54] MANUFACTURE OF CONTINUOUS GLASS FILAMENTS AND COMPOSITIONS THEREFOR

[75] Inventors: Barry C. Hobson; John Woodthorpe, both of Rochdale, England

[73] Assignee: T & N Research Materials Ltd., Manchester, England

[21] Appl. No.: 446,870

[22] Filed: Dec. 6, 1982

[30] Foreign Application Priority Data

Dec. 10, 1981 [GB] United Kingdom ................. 8137306

[51] Int. Cl.$^3$ ................................................ C03B 3/00
[52] U.S. Cl. ............................................ 501/38; 65/2; 65/27; 501/67
[58] Field of Search .................. 501/38, 67; 65/2, 27

[56] References Cited

U.S. PATENT DOCUMENTS 3,817,764  6/1974  Wolf .................................... 501/38
4,177,077  12/1979  Gagin ............................... 501/38 X

FOREIGN PATENT DOCUMENTS 601923  7/1960  Canada ................................ 501/38
734982  5/1966  Canada ................................ 501/38
2411863  9/1974  Fed. Rep. of Germany .
811243  4/1959  United Kingdom ................. 501/38

*Primary Examiner*—Robert L. Lindsay, Jr.
*Attorney, Agent, or Firm*—Cushman, Darby & Cushman

[57] ABSTRACT

A glass composition which can be drawn into continuous filaments at a temperature of 1050° C. or below, without risk of devitrification (crystallization), comprises by weight:

|  | % |
|---|---|
| $SiO_2$ | 49–55 |
| $Al_2O_3$ | 2–4 |
| $B_2O_3$ | 7–10 |
| $Na_2O$ | 14–18 |
| $K_2O$ | 0.5–3 |
| CaO | 8–12 |
| ZnO | 1–4.5 |
| $ZrO_2$ | 1–7.5 | and has a 1000-poise viscosity temperature not greater than 1050° C. and a liquidus temperature at least 20° C. below the 1000-poise viscosity temperature.

4 Claims, No Drawings

MANUFACTURE OF CONTINUOUS GLASS FILAMENTS AND COMPOSITIONS THEREFOR

This invention relates to the manufacture of continuous glass filaments and to glass compositions for use therein.

Processes for the manufacture of continuous glass filaments are to be distinguished from those for the manufacture of staple glass fibres. In the manufacture of such fibres molten glass is centrifugally spun through fine holes in the periphery of a spinner rotated at high speed, and the issuing filaments are broken into staple fibres by directing streams of gas at them. In the manufacture of continuous filaments the molten glass is allowed to flow under gravity through holes (fine, but coarser than those in a rotary spinner) in a stationary bushing, and the issuing streams of molten glass are drawn into filaments which, after application of a dressing, are collected together to form a strand. Usually, several strands are then collected together to form a roving.

Certain improved glass compositions for use in the manufacture of staple fibre by the centrifugal spinning process are described in U.S. Pat. No. 4,177,077 (equivalent to GB Pat. No. 2,006,749A), and they have, among other properties, the following two characteristics:

liquidus temperature: 1700°–1740° F. i.e. 927°–949° C.
1000-poise viscosity temperature: 1690°–1730° F. i.e. 921°–943° C.

The liquidus temperature is that below which the molten glass can exist in equilibrium with a crystalline phase, and is of importance because any crystals deposited from the melt can cause serious problems—for example, blocking of the spinner holes. The '1000-poise viscosity temperature' is the temperature at which the molten glass has a viscosity of 1000 poise. Now, for the centrifugal spinning glasses of U.S. Pat. No. 4,177,077, the 1000-poise viscosity temperature is not of significance for actual operation as distinct from characterisation. Thus, to take one particular glass disclosed in U.S. Pat. No. 4,177,077, of liquidus temperature 1720° F.(938° C.) and of the % weight composition SiO$_2$—55.2,
Al$_2$O$_3$—3.6,
B$_2$O$_3$—9.7,
Na$_2$O—17.0,
CaO—11.7,
ZnO—1.4, the balance (Fe$_2$O$_3$, K$_2$O, MgO and SO$_3$) being inpurities: this glass is described in U.S. Pat. No. 4,177,077 as having an estimated 1000-poise viscosity temperature of 1730° F. (943° C.), but the temperature at which it would be spun is in the range 1025°–1075° C. In that range of temperature the glass can be spun without breaking into droplets at the exits from the spinner holes; and it can be spun without risk of crystallisation because there is a difference of at least 87° C. (1025-938) between spinning temperature and liquidus temperature. In the range 1025° to 1075° C., the viscosity is in fact about 400 poise, not 1000 poise. There is a difference of only about 5° C. (i.e. 943°-938°) between the 1000-poise viscosity temperature and the liquidus temperature.

In spinning continuous filaments, as in rotary spinning, spinning has to be carried out at a temperature at which the glass will not break into droplets at the spinner exits and is not at risk of crystallisation. Formation of droplets is avoided by working at a fairly high viscosity—at least 700 poise; and it is our experience that, to be safe from crystallisation, there should be a difference of at least 20° C. between spinning temperature and liquidus temperature. Thus, the glass of composition set out in tabular form above would be entirely unsuitable for use in the manufacture of continuous filaments. So also would the other 'rotary spinning glasses' whose detailed composition is set out in the working examples of U.S. Pat. No. 4,177,077.

One glass that is used for the production of continuous filaments is that known as E glass, and a typical composition of it, together with a typical composition of a soda-lime glass (A glass) of the type used for making containers, is set out below:

|  | E | A |
|---|---|---|
| SiO$_2$ | 54 | 71.8 |
| Al$_2$O$_3$ | 14.2 | 1.0 |
| B$_2$O$_3$ | 8.6 | — |
| Na$_2$O | } 0.8 | 13.6 |
| K$_2$O |  | 0.6 |
| CaO | 19.5 | 8.8 |
| MgO | 3.1 | 3.8 |
| 1000-poise viscosity °C. | 1185 | 1184 |
| liquidus °C. | 1080 | 1010 |
| Na$_2$O loss/hour/gram of glass in water at 100° C. | 112 | 274 |

The E glass is spun at a temperature of 1200° C., which is much higher (by 120° C.) than the liquidus temperature. At 1200° C., its viscosity is about 800 poise.

The lowest entries in the above table relate to a further important property of glasses, namely the capacity to resist attack by water, as indicated by the amount of alkali (in terms of $\mu$g Na$_2$O per gram of glass) lost on immersion of the glass in finely divided form in pure water (water free from dissolved gases and heavy metals, of conductivity not greater than 10-6 mhos/cm at 20° C. ) for one hour at 100° C. A loss of 250 $\mu$g (as shown by crushed soda-lime glass A) is unacceptably high for glasses to be formed into continuous filaments intended for general use. The E glass has satisfactory water-resistance but as already stated it requires heating to about 1200° C. in order that continuous filaments may be spun from it. With fuel so expensive, it is desirable to employ a glass which can be spun at lower temperature.

The present invention is based on our discovery that glasses of the weight composition set out below can be safely spun into continuous filaments of acceptable water-resistance at a temperature of 1050° C. or less.

The glasses are of the composition (in % by weight):
SiO$_2$—49-55,
Al$_2$O$_3$—2-4,
B$_2$O$_3$—7-10,
Na$_2$O—14-18,
K$_2$O—0.5-3,
CaO—8-12,
ZnO—1-4.5,
ZrO$_2$—1-7.5, and have a 1000-poise viscosity temperature not greater than 1050° C. and a liquidus temperature at least 20° C. below the 1000-poise viscosity temperature.

Preferably, the glass employed is such that its 1000-poise viscosity temperature is not greater than 1025° C.

The zirconia which is an essential ingredient of the above glasses is known to impart to glasses generally improved durability to chemical attack. What is surprising is that the zirconia in our composition does not, generally speaking, raise the spinning temperature or adversely affect the liquidus temperature. Indeed, as shown by Examples 2 and 3 later in this specification, glasses containing 4 and 7% of $ZrO_2$ respectively are unexpectedly resistant to devitrification (crystallisation).

The compositions may contain $TiO_2$ in an amount up to 7% by weight. The preferred content of $TiO_2$ is in the range 2-7%.

The constituents silica, boric oxide, lime, zinc oxide and zirconia are preferably present in the following proportions (in % by weight):

$SiO_2$—50-53
$B_2O_3$—7-8.5
$CaO$—8-9.5
$ZnO$—2-4.5
$ZrO_2$—2.5-7.5.

Particular examples of suitable glasses, with their properties, are as follows:

|  | 1 | 2 | 3 | 4 | 5 | 6 |
|---|---|---|---|---|---|---|
| $SiO_2$ | 49.3 | 50.4 | 50.4 | 50.9 | 51.4 | 52.4 |
| $Al_2O_3$ | 3.7 | 2.8 | 2.8 | 3.0 | 3.0 | 2.8 |
| $B_2O_3$ | 8.4 | 7.7 | 7.7 | 8.5 | 7.7 | 7.7 |
| $Na_2O$ | 17.8 | 15.1 | 15.1 | 15.8 | 16.0 | 15.1 |
| $K_2O$ | 0.9 | 1.7 | 1.7 | 1.1 | 1.0 | 1.7 |
| $CaO$ | 9.3 | 8.5 | 8.5 | 8.8 | 8.9 | 8.5 |
| $ZnO$ | 1.9 | 4.0 | 4.0 | 2.6 | 2.6 | 4.0 |
| $ZrO_2$ | 3.0 | 4.0 | 7.0 | 2.7 | 3.0 | 2.0 |
| $TiO_2$ | 3.7 | 5.8 | 2.8 | 6.1 | 6.3 | 5.8 |
| $MgO$ | — | — | — | — | — | — |
| $Fe_2O_3$ | 1.9 | — | — | 0.1 | — | — |
| 1000-poise viscosity °C. | 974 | 993 | 1024 | 963 | 990 | 976 |
| liquidus °C. | 919 | <950 | <950 | 912 | 964 | 939 |
| $Na_2O$ loss/hour/ gram of glass in water at 100° C. | 204 | 120 | 97 | 232 | 130 | 175 |

|  | 7 | 8 | 9 | 10 | 11 |
|---|---|---|---|---|---|
| $SiO_2$ | 52.6 | 52.8 | 52.9 | 54.4 | 55.0 |
| $Al_2O_3$ | 3.2 | 3.7 | 3.0 | 2.8 | 3.4 |
| $B_2O_3$ | 7.3 | 9.7 | 7.7 | 7.7 | 8.9 |
| $Na_2O$ | 15.3 | 15.8 | 16.0 | 15.1 | 15.9 |
| $K_2O$ | 1.1 | 2.6 | 1.0 | 1.7 | 1.0 |
| $CaO$ | 8.8 | 10.7 | 8.9 | 8.5 | 11.3 |
| $ZnO$ | 2.6 | 1.4 | 2.6 | 2.0 | 1.5 |
| $ZrO_2$ | 2.6 | 3.0 | 1.5 | 2.0 | 3.0 |
| $TiO_2$ | 6.1 | — | 6.3 | 5.8 | — |
| $MgO$ | 0.4 | 0.2 | — | — | — |
| $Fe_2O_3$ | 0.1 | — | — | — | — |
| 1000-poise viscosity °C. | 975 | 983 | 986 | 1000 | 994 |
| liquidus °C. | 934 | 898 | 954 | 930 | 942 |
| $Na_2O$ loss/hour/ gram of glass in water at 100° C. | 184 | 225 | 160 | 191 | 178 |

In the above compositions, the MgO and $Fe_2O_3$ are to be regarded as impurities.

The above glasses are made by entirely conventional methods from conventional ingredients and additives, and may be made into continuous filaments at a temperature of 1050° C. or below (depending on the particular viscosity-temperature relationship of the glass) by procedures that are otherwise entirely conventional, as described for example in Chapter 5 of 'Manufacturing Technology of Continuous Glass Fibres' by K. L. Loewenstein (Elsevier 1973). Preferably, of course, the glass is spun at as low a temperature as it will stand. The above compositions can in fact all be safely spun below 1025° C. The $Na_2O$ losses given in the above table were determined using crushed glass (passing a sieve of aperture 500 μm, but retained on a sieve of 300 μm aperture).

We claim:

1. A process for the manufacture of continuous glass filaments by causing molten glass to flow under gravity through holes in a stationary bushing and drawing the issuing streams of molten glass into continuous filaments, in which the glass employed consists essentially of (in percent by weight):

$SiO_2$—49-55
$Al_2O_3$—2-4
$B_2O_3$—7-10
$Na_2O$—14-18
$K_2O$—0.5-3
$CaO$—8-12
$ZnO$—1-4.5
$ZrO_2$—1-1.5 and has a 1000 poise viscosity temperature not greater than 1050° C. and a liquidus temperature at least 20° C. below the 1000 poise viscosity temperature; and the glas is drawn into filaments at a temperature of 1050° C. or less.

2. A process according to claim 1, in which the glass employed also contains $TiO_2$, in an amount up to 7% by weight.

3. A process according to claim 2, in which the $TiO_2$ content is in the range 2-7%.

4. Glass in the form of continuous filaments consisting essentially of

|  | % by weight |
|---|---|
| SiO | 49-55 |
| $Al_2O_3$ | 2-4 |
| $B_2O_3$ | 7-10 |
| $Na_2O$ | 14-18 |
| $K_2O$ | 0.5-3 |
| $CaO$ | 8-12 |
| $ZnO$ | 1-4.5 |
| $ZrO_2$ | 1-7.5 |
| $TiO_2$ | 0-7 | and having a 1000 poise viscosity temperature not greater than 1050° C. and a liquidus temperature at least 20° C. below the 1000-poise viscosity temperature.

* * * * *